(12) United States Patent
Fujii et al.

(10) Patent No.: US 9,680,566 B2
(45) Date of Patent: Jun. 13, 2017

(54) TRANSMISSION APPARATUS AND METHOD

(71) Applicant: FUJITSU LIMITED, Kawasaki-shi, Kanagawa (JP)

(72) Inventors: Yasuki Fujii, Kawasaki (JP); Takao Naito, Musashino (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 1 day.

(21) Appl. No.: 14/661,418

(22) Filed: Mar. 18, 2015

(65) Prior Publication Data

US 2015/0326310 A1    Nov. 12, 2015

(30) Foreign Application Priority Data

May 7, 2014    (JP) ................... 2014-096331

(51) Int. Cl.
| | |
|---|---|
| *H04B 10/038* | (2013.01) |
| *H04B 10/50* | (2013.01) |
| *H04B 10/08* | (2006.01) |
| *H04J 14/02* | (2006.01) |
| *H04B 10/275* | (2013.01) |
| *H04B 10/035* | (2013.01) |

(52) U.S. Cl.
CPC ......... *H04B 10/038* (2013.01); *H04B 10/035* (2013.01); *H04B 10/275* (2013.01); *H04J 14/0283* (2013.01); *H04J 14/0289* (2013.01); *H04J 14/0293* (2013.01)

(58) Field of Classification Search
CPC ... H04B 10/038; H04B 10/035; H04B 10/275
USPC .................................. 398/3, 1, 48
See application file for complete search history.

(56) References Cited

U.S. PATENT DOCUMENTS

| | | | |
|---|---|---|---|
| 2002/0114031 A1 | 8/2002 | Yamada | |
| 2004/0175179 A1* | 9/2004 | Xiao | G02B 6/29362 398/83 |

(Continued)

FOREIGN PATENT DOCUMENTS

| | | |
|---|---|---|
| JP | 2002-247038 | 8/2002 |
| JP | 2013-30884 | 2/2013 |
| JP | 2013-46269 | 3/2013 |

*Primary Examiner* — Oommen Jacob
(74) *Attorney, Agent, or Firm* — Staas & Halsey LLP

(57) ABSTRACT

A transmission apparatus includes: a storage unit to store a table in which a wavelength terminated by each of transmission apparatuses is associated with each of the transmission apparatuses; a transmission unit to transmit a message including failure information to other transmission apparatus when a failure occurs; a switch controller to determine whether its own transmission apparatus is a last transmission apparatus that terminates the wavelength among transmission apparatuses that are present on a path up to a link where the failure, based on the table, when receiving the message from other transmission apparatus, and to perform a control of switching a transmission direction of a signal having the wavelength when the switch controller determines that its own transmission apparatus is the last transmission apparatus to terminate the wavelength; and a switch to switch a transmission direction of the signal for each wavelength under a control of the switch controller.

6 Claims, 14 Drawing Sheets

(56) References Cited

U.S. PATENT DOCUMENTS

| | | | |
|---|---|---|---|
| 2005/0141437 A1* | 6/2005 | Burnett | H04J 14/0227 370/254 |
| 2006/0013584 A1* | 1/2006 | Miyazaki | H04J 14/0227 398/19 |
| 2006/0171717 A1* | 8/2006 | Kikuchi | H04J 14/0206 398/83 |
| 2007/0269211 A1* | 11/2007 | Doerr | H04J 14/0209 398/49 |
| 2009/0074418 A1* | 3/2009 | Levy | H04J 14/0227 398/83 |
| 2010/0150551 A1* | 6/2010 | Yamahara | H04J 14/0212 398/34 |
| 2011/0222396 A1* | 9/2011 | Tochio | H04L 12/437 370/222 |
| 2011/0236012 A1* | 9/2011 | Wakabayashi | H04J 3/085 398/3 |
| 2012/0320798 A1* | 12/2012 | Mutoh | H04L 12/40032 370/254 |
| 2013/0028592 A1* | 1/2013 | Fujii | H04Q 11/0005 398/5 |
| 2013/0051787 A1 | 2/2013 | Tochio | |
| 2013/0259473 A1* | 10/2013 | Fujii | H04J 14/02 398/48 |
| 2015/0326310 A1* | 11/2015 | Fujii | H04B 10/038 398/3 |

\* cited by examiner

FIG.2

| WAVELENGTH | NODE ┌101 | | | |
|---|---|---|---|---|
| | A | B | C | D |
| λ1 | 1 | 1 | 1 | 1 |
| λ2 | 1 | 1 | 0 | 1 |
| λ3 | 1 | 0 | 0 | 1 |

FIG.3

| WAVELENGTH | CONFIGURATION INFORMATION ┌102 |
|---|---|
| λ1 | 1 |
| λ2 | 1 |
| λ3 | 0 |

FIG.8

| APS1 | | | | | | | | APS2 | | | | | | | | APS3 | | | | | | | | APS4 ⌐1a | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Bridge Request | | | | | Status | | | Destination Node ID | | | | | | | L/S | Source Node ID | | | | | | | T/H | PCC Byte | | | | | | | |

TRANSMISSION APPARATUS AND METHOD

CROSS-REFERENCE TO RELATED APPLICATION

This application is based upon and claims the benefit of priority from the prior Japanese Patent Application No. 2014-096331 filed on May 7, 2014, the entire contents of which are incorporated herein by reference.

FIELD

The embodiments discussed herein are related to a transmission apparatus which is one of a plurality of transmission apparatuses forming a ring network.

BACKGROUND

In a protection scheme of a wavelength multiplexed OTN ring, when a failure occurs in a link, the failure is detected at the nodes of both ends of the failure link, and a switch message is transmitted in a reverse direction to a direction where the failure is detected. The switch message is a message for notifying each node of switching of a transmission direction of an optical signal. The switch message is prepared at the nodes of both ends of the failure link where the failure is detected, and has information of which a reception destination is the node of the other end of the failure link. A node in a halfway transfers the switch message, and the switch message finally arrives at the node of the other end of the failure link.

In a wavelength multiplexed ring network, the switch message is independently transmitted for each wavelength. However, when the number of wavelength-multiplexed wavelengths increases, the number of switch messages transmitted and received between the nodes increases, which increases the processing load at each node, and as a result, causes a delay in restoration from a failure.

Therefore, there is a technique that a plurality of wavelengths is made into one group and one switch message is transmitted in a group unit when the failure occurs in the link in the ring network. In this technique, when the failure occurs in one or more wavelengths in the group, one switch message is transmitted in the group unit, such that the transmission directions of optical signals of the respective wavelengths are integrated and switched at the node of the link end. As a result, as compared with the case in which the switch message is transmitted for each wavelength, the number of switch messages transmitted and received between the nodes may be decreased.

Related techniques are disclosed in, for example, Japanese Laid-Open Patent Publication No. 2013-030884, Japanese Laid-Open Patent Publication No. 2013-046269, and Japanese Laid-Open Patent Publication No. 2002-247038.

SUMMARY

According to an aspect of the invention, a transmission apparatus is one of a plurality of transmission apparatuses forming a ring network, the transmission apparatus includes: a storage unit configured to store a table in which a wavelength terminated by each of the plurality of transmission apparatuses is associated with each of the plurality of transmission apparatuses; a transmission unit configured to transmit a message including failure information to other transmission apparatus when a failure occurs in the ring network; a switch controller configured to determine whether its own transmission apparatus is a last transmission apparatus that terminates the wavelength among a plurality of transmission apparatuses that are present on a path up to a link where the failure occurs in the ring network, based on the table, when receiving the message including the failure information from other transmission apparatus, and to perform a control of switching a transmission direction of a signal having the wavelength when the switch controller determines that its own transmission apparatus is the last transmission apparatus to terminate the wavelength; and a switch configured to switch a transmission direction of the signal for each wavelength under a control of the switch controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a ring configuration information table;

FIG. 3 is a diagram illustrating an example of a node configuration information table;

FIG. 8 is a diagram illustrating an example of an APS byte;

DESCRIPTION OF EMBODIMENTS

The transmission direction of an optical signal may not be accurately controlled when a failure occurs in a network.

When the volume of added/dropped traffic is small in a node, the node may not terminate but allows optical signals having some wavelengths to pass (it might be described, allows some wavelengths to pass) in order to reduce the apparatus expense. For example, in the ring network, the node of the failure link end allows a predetermined wavelength to pass, but a node disposed one node before the node of the failure link end terminates the wavelength. In the case where the failure occurs in the link of the ring network, when the switch message is transmitted in a group unit, a reception destination of the switch message is the node of the failure link end, and as a result, the transmission direction of the optical signal is not switched in the node disposed one node before the node. As a result, the optical signal that has passed through the node disposed one node before the node may be transmitted to the failure link by passing through the node of the failure link end. That is, when there is a wavelength which passes through the node of the failure link end, the transmission direction of the optical signal is not accurately controlled.

Hereinafter, the transmission apparatus that controls the transmission direction of the optical signal for each wavelength when the failure occurs in the network will be described using the accompanied drawings. Further, the scope of the invention is not limited by the embodiments. The respective embodiments may be appropriately combined within the range without contradicting the processing contents.

Configuration of Transmission Apparatus of Embodiment

Figure 1:
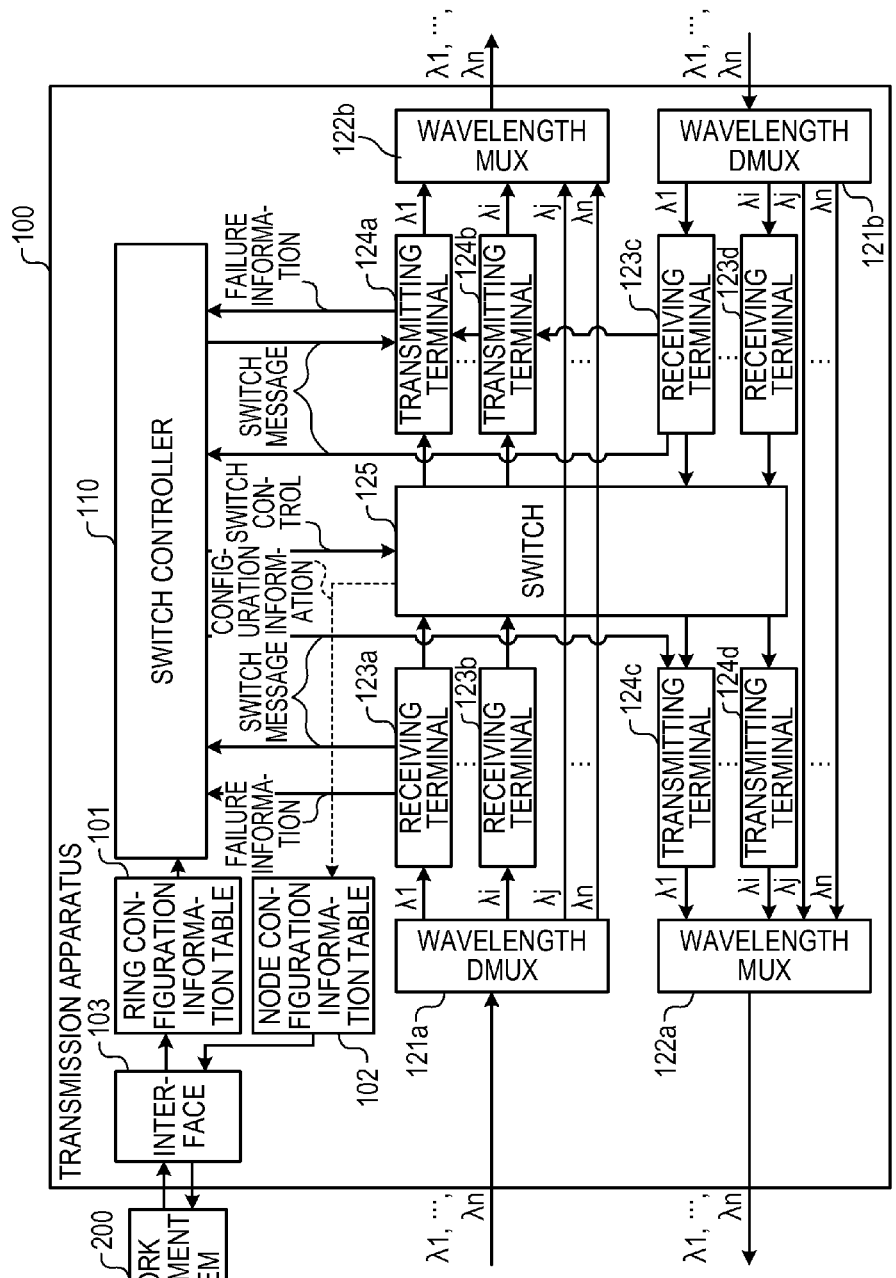
FIG. 1 is a diagram illustrating a first example of a configuration of a transmission apparatus of an embodiment.

FIG. 1 is a diagram illustrating a first example of a configuration of a transmission apparatus of an embodiment. As illustrated in the example of FIG. 1, the transmission apparatus 100 includes a ring configuration information table 101, a node configuration information table 102, an interface 103, a switch controller 110, a wavelength demultiplexer (DMUX) 121a, a wavelength demultiplexer (DMUX) 121b, a wavelength multiplexer (MUX) 122a, and a wavelength multiplexer (MUX) 122b. Further, the transmission apparatus 100 includes receiving terminals 123a to 123d, transmitting terminals 124a to 124d, and a switch 125. Further, in the following description, the respective transmission apparatuses 100 constituting the ring network may be called as nodes.

The ring configuration information table 101 and the node configuration information table 102 are stored in storage devices, such as, semiconductor memory devices, for example, a random access memory (RAM), a read only memory (ROM), and a flash memory, a hard disk or an optical disk.

FIG. 2 is a diagram illustrating an example of a ring configuration information table. A network management system 200 creates the ring configuration information table 101 based on the node configuration information table 102 of each transmission apparatus 100. The ring configuration information table 101 is a table indicating whether each node of nodes A to D terminates each wavelength of wavelengths λ1 to λ3. As illustrated in the example of FIG. 2, each of the columns corresponds to the nodes A to D, respectively, and each of the rows corresponds to wavelengths λ1 to λ3, respectively. The ring configuration information table 101 indicates that the node does not terminate the wavelength when "0" is stored. Further, the ring configuration information table 101 indicates that the node terminates the wavelength when "1" is stored.

For example, the ring configuration information table 101 indicates that the node A terminates the wavelength λ1, the wavelength λ2, and the wavelength λ3. Further, the ring configuration information table 101 indicates that the node B terminates the wavelength λ1, the wavelength λ2, but does not terminate the wavelength λ3. In addition, the ring configuration information table 101 indicates that the node C terminates the wavelength λ1, but does not terminate the wavelength λ2, and the wavelength λ3. For example, the ring configuration information table 101 indicates that the node D terminates the wavelength λ1, the wavelength λ2, and the wavelength λ3.

FIG. 3 is a diagram illustrating an example of a node configuration information table. The node configuration information table 102 is a table indicating whether the transmission apparatus 100 terminates each wavelength. The node configuration information table 102 shown in the example of FIG. 3 is the node configuration information table 102 of the node B. The node configuration information table 102 indicates that the transmission apparatus 100 does not terminate the wavelength when "0" is stored. Meanwhile, the node configuration information table 102 indicates that the transmission apparatus 100 terminates the wavelength when "1" is stored. For example, as illustrated in the example of FIG. 3, the node configuration information table 102 indicates that the transmission apparatus 100 terminates the wavelength λ1, the wavelength λ2, but does not terminate the wavelength λ3.

The interface 103 is implemented by, for example, a network interface card (NIC). The interface 103 is a communication interface that is connected with the network management system 200 through the network and responsible for communicating information with the network management system 200. Further, communication between the transmission apparatus 100 and the network management system will be described below in detail.

The wavelength demultiplexers 121a and 121b demultiplex a wavelength multiplexed input signal into each wavelength. The wavelength multiplexer 122b multiplexes each demultiplexed wavelengths and outputs the multiplexed wavelengths as an output signal. The receiving terminals 123a to 123d convert optical signals having wavelengths demultiplexed by the wavelength demultiplexers 121a and 121b into electrical signals. The receiving terminals 123a to 123d output the converted electrical signals to the switch 125. Further, the receiving terminals 123a to 123d detect the failure of each wavelength or extract the switch message from the electrical signal. The receiving terminals 123a to 123d output the extracted switch message to the switch controller 110.

The transmitting terminals 124a to 124d receive the electrical signals including the switch message from the switch 125. The transmitting terminals 124a to 124d convert the received electrical signals into the optical signals for the respective wavelengths and deliver the converted optical signals to the wavelength multiplexers 122a and 122b.

As illustrated in the example of FIG. 1, the transmission apparatus 100 has a path which goes through the wavelength demultiplexer 121a and the wavelength multiplexer 122b and a path which goes through the wavelength demultiplexer 121b and the wavelength multiplexer 122a. For example, the transmission apparatus 100 uses a path which goes through the wavelength demultiplexer 121a and the wavelength multiplexer 122b as a working path. Meanwhile, the transmission apparatus 100 uses a path which goes through the wavelength demultiplexer 121b and the wavelength multiplexer 122a as a protection path.

The switch 125 outputs, as the output signals, the input signals input from the receiving terminals 123a to 123d to the corresponding transmitting terminals 124a to 124d, respectively, to form the path. For example, the switch 125 forms a path which goes through the wavelength demultiplexer 121a, the receiving terminal 123a, the switch 125, the transmitting terminal 124a, and the wavelength multiplexer 122b. Further, the switch 125 outputs configuration information regarding the wavelength to be terminated to the node configuration information table 102.

The switch controller 110 is a processing unit that collects the switch messages from the receiving terminals 123a to 123d to sense the occurrence of the failure and switches the transmission direction of the optical signal by controlling the switch 125 when the failure occurs. Hereinafter, the processing of switching the transmission direction of the optical signal is called a loop-back. The switch controller 110 collects the switch messages from the receiving terminals 123a to 123d. When the switch controller 110 collects the switch messages, the switch controller 110 determines whether to loop back the optical signal for each wavelength. When the switch controller 110 intends to loop back the optical signal, the switch controller 110 controls the switch 125. The switch controller 110 outputs the switch messages collected from the receiving terminals 123a to 123d to the transmitting terminals 124a to 124d.

The processing in which the switch controller 110 controls the switch 125 will be described. When the switch controller 110 senses the failure of the ring network by the switch messages collected from the receiving terminals 123a to 123d, the switch controller 110 restores the ring network by causing the switch 125 to loop back the optical signal to detour the failure link. For example, the switch controller 110 forms the path which goes through the wavelength demultiplexer 121a, the receiving terminal 123a, the switch 125, the transmitting terminal 124c, and the wavelength multiplexer 122a to detour the failure link when the failure occurs in the ring network.

For example, a central processing unit (CPU) executes a predetermined program to implement a function of the switch controller 110 of the transmission apparatus 100. Further, the function of the switch controller 110 may be implemented by an integrated circuit such as an application specific integrated circuit (ASIC) or a field programmable gate array (FPGA).

The transmission apparatus 100 may terminate some wavelengths and allows other wavelengths to pass. For example, as illustrated in the example of FIG. 1, the transmission apparatus 100 allows the wavelength λ1 to pass through the receiving terminal 123a, the switch 125, and the transmitting terminal 124a, and allows a wavelength λj to pass. Further, the transmission apparatus 100 allows the wavelength λi to pass through the receiving terminal 123b, the switch 125, and the transmitting terminal 124b and allows a wavelength λn to pass.

Figure 4:
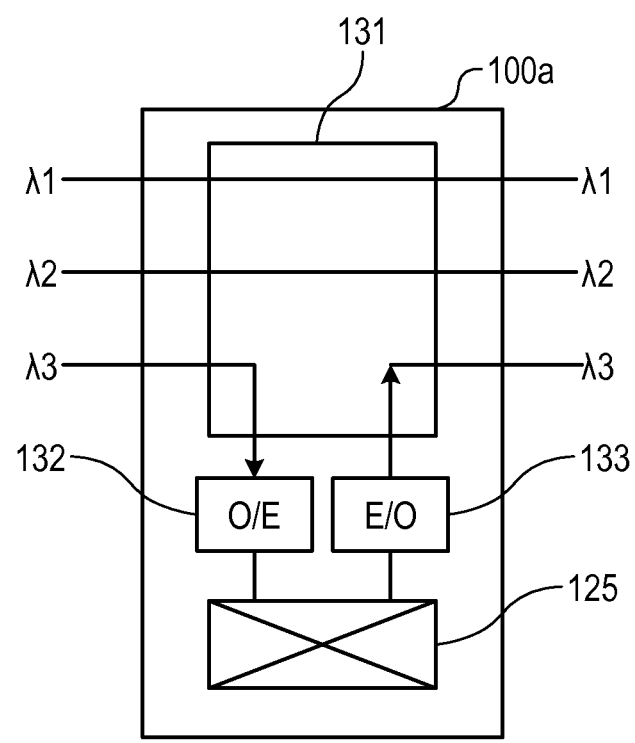
FIG. 4 is a diagram illustrating a second example of the configuration of the transmission apparatus of the embodiment.

FIG. 4 is a diagram illustrating a second example of the configuration of the transmission apparatus of the embodiment. The transmission apparatus 100 may dynamically switch between the wavelength to be terminated and the wavelength to be passed through. With reference to FIG. 4, the case in which a transmission apparatus 100a dynamically switches between the wavelengths to be terminated and the wavelength to be passed through will be described. Similarly to the example of FIG. 4, the transmission apparatus 100a includes a wavelength selection unit 131, an optical/electricity (O/E) conversion unit 132, an electricity/optical (E/O) conversion unit 133, and the switch 125. Further, in FIG. 4, some components of the transmission apparatus 100a, for example, the switch controller 110, the wavelength demultiplexer 121, and the wavelength multiplexer 122 are omitted.

The wavelength selection switch 131 is a processing unit that selects the wavelength to be terminated among the optical signals having the respective wavelengths demultiplexed by the wavelength demultiplexer 121. The wavelength selection switch 131 may dynamically change between the wavelengths to be terminated.

For example, as illustrated in the example of FIG. 4, the wavelength selection switch 131 selects the optical signal having the wavelength λ3 and outputs the selected optical signal to the O/E conversion unit 132. Meanwhile, the wavelength selection switch 131 allows the optical signals having the wavelengths λ1 and λ2 to pass. Further, the wavelength selection switch 131 may select the wavelengths λ1 and λ2 to terminate the wavelengths and cancel the selection of the wavelength λ3 to allow the wavelength λ3 to pass.

The O/E conversion unit 132 converts the optical signal having the wavelength λ3 selected by the wavelength selection switch 131 into the electrical signal. The O/E conversion unit 132 outputs the converted electrical signal to the switch 125. The switch 125 outputs the input signal to the E/O conversion unit 133 as the output signal to form the path. The E/O conversion unit 133 receives the electrical signal depending on the wavelength λ3 including the switch message from the switch 125. The E/O conversion unit 133 converts the received electrical signal into the optical signal having the wavelength λ3 and delivers the converted optical signal.

Configuration Example of Ring Network

Figure 5:
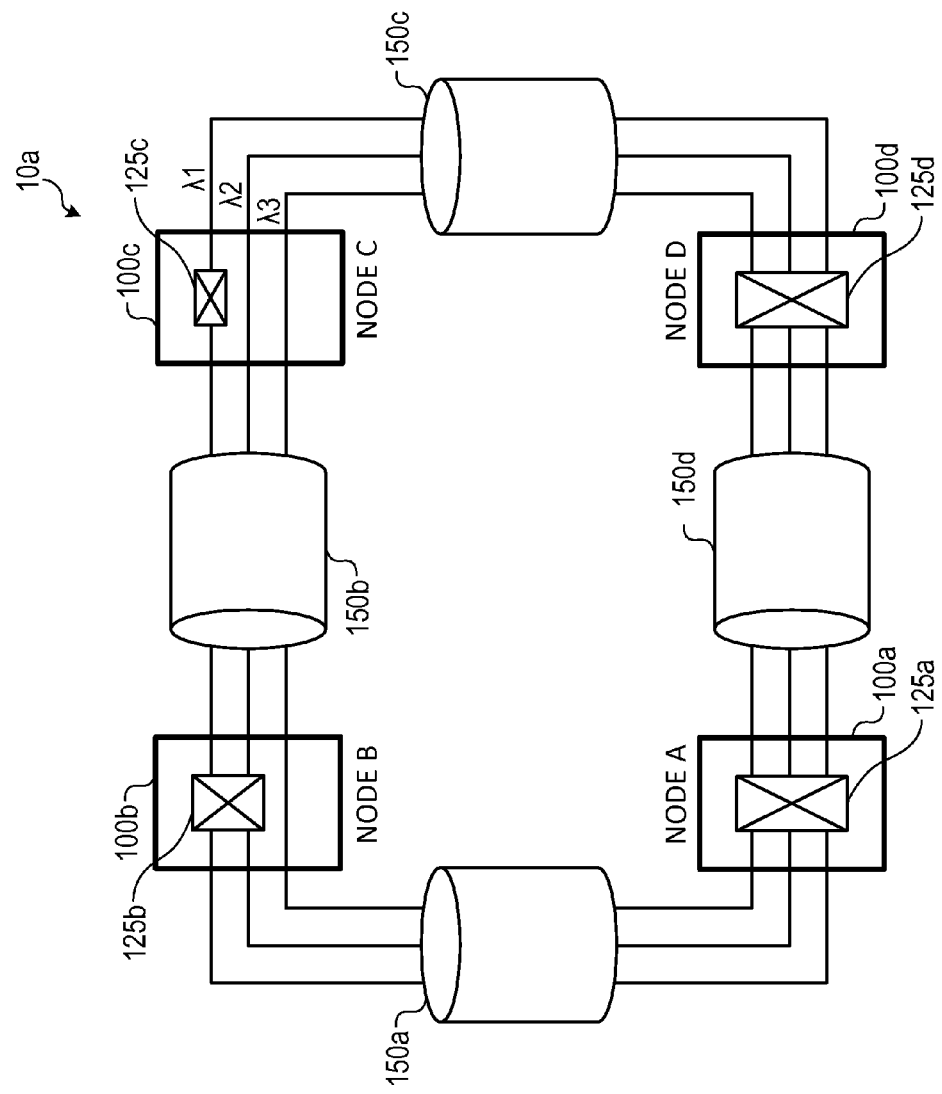
FIG. 5 is a diagram illustrating a first example of a ring network.

FIG. 5 is a diagram illustrating a first example of a ring network. As illustrated in the example of FIG. 5, a ring network 10a includes transmission apparatuses 100a to 100d and links 150a to 150d. Each pair of the transmission apparatus 100a and the transmission apparatus 100b, the transmission apparatus 100b and the transmission apparatus 100c, the transmission apparatus 100c and the transmission apparatus 100d, and the transmission apparatus 100d and the transmission apparatus 100a is connected with each other by an optical fiber and forms the ring network 10a. Further, the optical signals having the wavelengths λ1 to λ3 are multiplexed and transmitted/received between the transmission apparatuses 100 of the ring network 10a.

The transmission apparatuses 100a to 100d include switches 125a to 125d, respectively. In the example of FIG. 5, for example, the wavelength demultiplexer 121, the receiving terminal 124, and the wavelength multiplexer 122 are not illustrated. The wavelengths of the optical signals terminated by the switches 125 are different between the respective transmission apparatuses 100. For example, the switch 125a depending on the transmission apparatus 100a terminates the wavelengths λ1 to λ3. The switch 125b depending on the transmission apparatus 100b terminates the wavelengths λ1 and λ2, but allows the wavelength λ3 to pass. The switch 125c depending on the transmission apparatus 100c terminates the wavelength λ1, but allows the wavelengths λ2 and λ3 to pass. The switch 125d depending on the transmission apparatus 100d terminates the wavelengths λ1 to λ3.

The transmission apparatuses 100a to 100d may dynamically switch between the wavelengths to be passed through and allow other wavelength to pass when the volume of added/dropped traffic by its own transmission apparatus is small. The transmission apparatuses 100a to 100d allow some wavelengths to pass to reduce the processing load of the optical signal, thereby decreasing apparatus expense.

Processing in Transmission Apparatus

Figure 6:
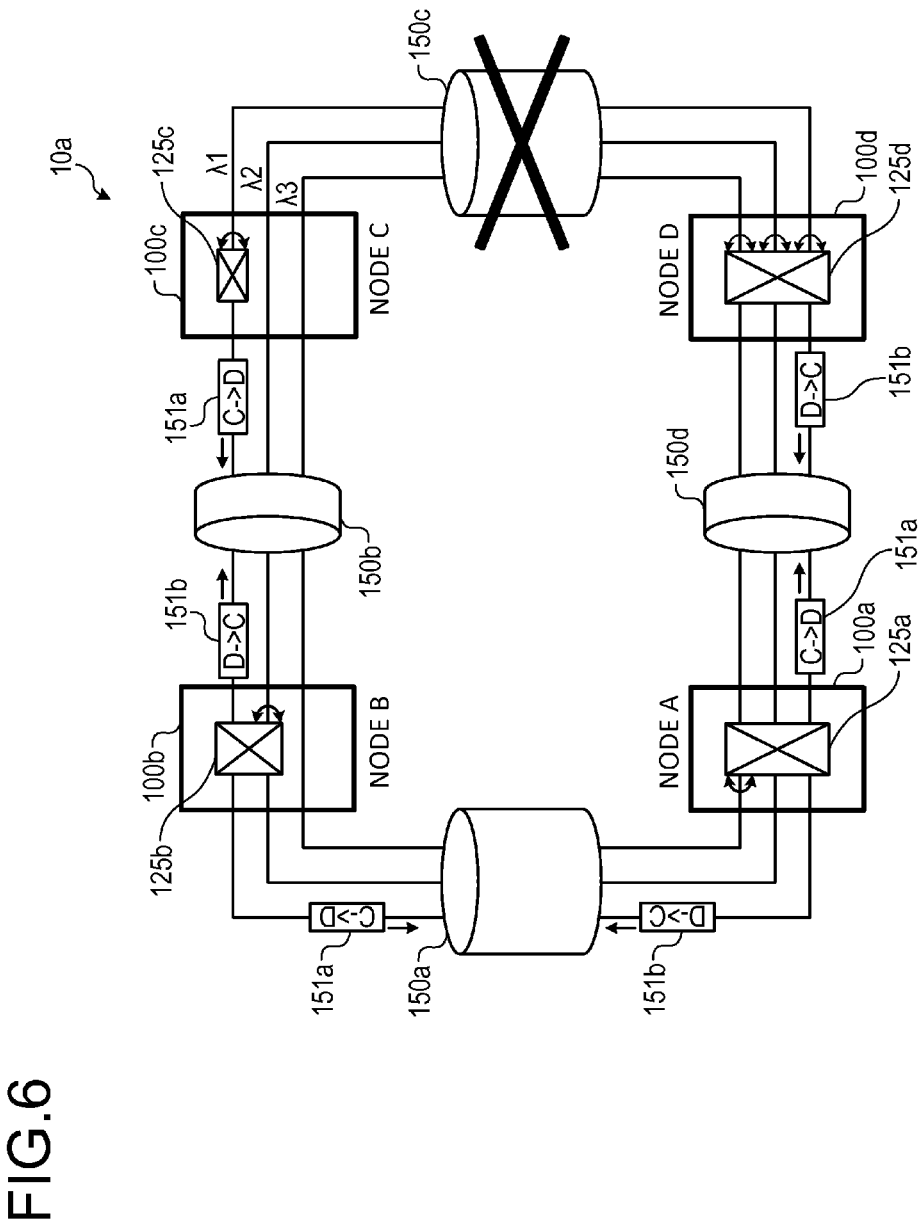
FIG. 6 is a first diagram for describing processing in the transmission apparatus of the embodiment.

FIG. 6 is a first diagram for describing processing in the transmission apparatus of the embodiment. Referring to FIG. 6, the processing performed in the transmission apparatus 100 of the embodiment when the failure occurs in the ring network 10a will be described. As illustrated in the example of FIG. 6, the failure occurs in a link 150c of the ring network 10a, and as a result, the ring network 10a is in a state where the optical signal may not be transmitted/received between the transmission apparatus 100c and the transmission apparatus 100d.

The transmission apparatuses 100a to 100d make a plurality of wavelengths into one group to perform a group protection. The group protection is processing that restores the failure by a group by treating the plurality of wavelengths as one group. When the failure occurs in the ring network 10a, the transmission apparatuses 100a to 100d transmit the switch message from the transmission apparatus 100 at the link end where the failure occurs to the transmission apparatus 100 at the other one link end as the reception destination. The transmission apparatus 100 at the link end transmits the switch message in the reverse direction to the link where the failure occurs. Each transmission apparatus 100 which the switch message goes through until the switch message is transmitted to the transmission apparatus 100 at the link end of the reception destination, transmits the switch message to the subsequent transmission apparatus 100. The switch message is finally transmitted to the transmission apparatus 100 at the link end of the reception destination.

The transmission apparatus 100 at the link end transmits one switch message to the transmission apparatus 100 of the link end of the reception destination by using one wavelength. The transmission apparatus 100 at the link end selects the wavelength to be terminated in the transmission apparatuses 100 at both ends of the link where the failure occurs and transmits the switch message by using the selected wavelength.

For example, the transmission apparatus 100c transmits one switch message 151a to the transmission apparatus 100d which is the destination by using the wavelength λ1. The transmission apparatus 100d receives the switch message 151a via the transmission apparatus 100b and the transmission apparatus 100a. Meanwhile, the transmission apparatus 100d transmits one switch message 151b to the transmission apparatus 100c which is the destination by using the wavelength λ1. The transmission apparatus 100c receives the switch message 151b via the transmission apparatus 100a and the transmission apparatus 100b. Further, the transmission apparatus 100c or the transmission apparatus 100d transmits the switch message by using the wavelength λ1, but may transmit the switch message by using, for example, other wavelengths terminated in the transmission apparatus 100c and in the transmission apparatus 100d.

Each transmission apparatus 100 determines whether to loop back the optical signal for each wavelength by referring to the ring configuration information table 101 when receiving the switch message 151. For example, the transmission apparatus 100 loops back the optical signal when, regarding a predetermined wavelength, a value of a received node is "1" and values up to a node of a reception destination of the switch message 151 from the next node of the received node are all "0s" in the ring configuration information table 101. Each transmission apparatus 100 transmits the optical signal in a reverse direction to a transmission direction of the switch message 151 in the case of looping back the optical signal.

Next, referring to FIG. 2, a detailed example of the processing of looping back the optical signal, which is performed in each transmission apparatus 100, will be described. Each transmission apparatus 100 performs the following processing on the optical signals having the wavelengths λ1 to λ3 transmitted from the node D to the node C via the nodes A and the node B. For example, the node C that receives the switch message 151b from the node D via the node A and the node B loops back the optical signal having the wavelength λ1 in its own node because its own node is the reception destination node of the switch message 151b.

The node B that receives the switch message 151b from the node D via the node A loops back the optical signal having the wavelength λ2 to its own node because a value of the node B is "1" in a record of the wavelength λ2 and a value of the node C of the reception destination node is "0", for the wavelength λ2.

The node A that receives the switch message 151b from the node D has a value of "1" in a record of the wavelength λ3, while a value of the node B is "0" and the value of the node C which is the reception destination node is "0" for the wavelength λ3. Therefore, the node A loops back the optical signal having the wavelength λ3 in its own node.

Meanwhile, regarding the optical signals having the wavelengths λ1 to λ3 transmitted from the node C to the node D via the nodes B and A, values of the node D are all "1s" and the node D terminates all of the optical signals having the wavelengths λ1 to λ3. As a result, when the switch message 151a is received, the node D loops back each of the optical signals having the wavelengths λ1 to λ3.

Figure 7:
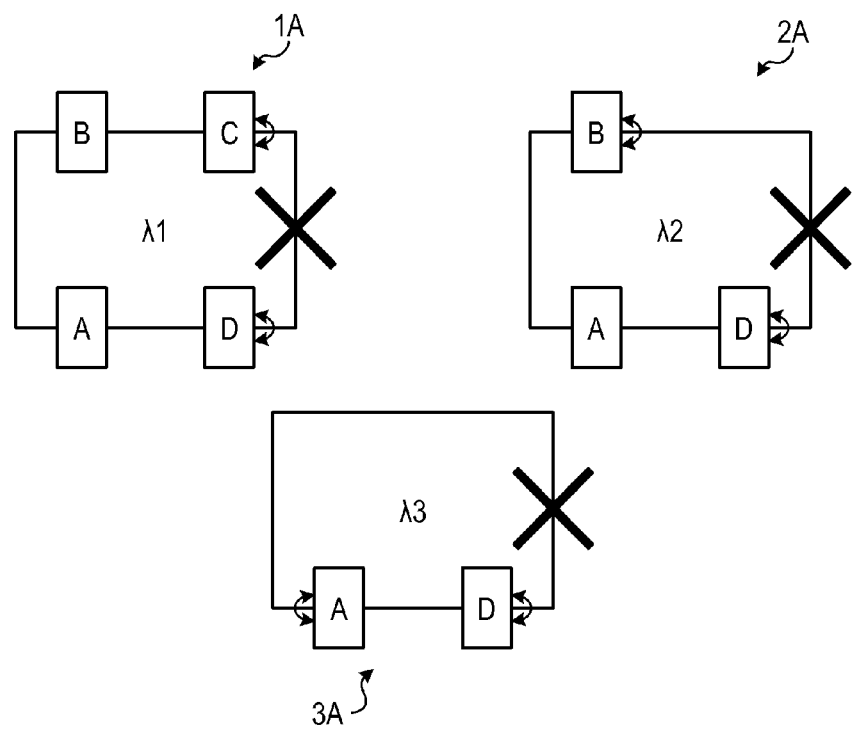
FIG. 7 is a second diagram for describing the processing in the transmission apparatus of the embodiment.

FIG. 7 is a second diagram for describing the processing in the transmission apparatus of the embodiment. Ring networks 1A to 3A illustrated in the example of FIG. 7 are formed by separating the ring network 10a for the respective wavelengths λ1 to λ3. In the ring networks 1A to 3A illustrated in FIG. 7, only the nodes which terminate the wavelengths are illustrated and the nodes that allow the wavelengths to pass are excluded.

For example, the ring network 1A is constituted by the nodes A, B, C, and D terminating the wavelength λ1 in FIG. 7. The reference numeral "x" indicates the link where the failure occurs. As illustrated in the example of FIG. 7, the optical signal transmitted in the sequential order of the nodes C, B, A, and D is looped back in the node D. Meanwhile, the optical signal transmitted in the sequential order of the nodes D, A, B, and C is looped back in the node C.

The ring network 2A is constituted by the nodes A, B, and D that terminate the wavelength λ2. Since the node C allows the wavelength λ2 to pass, the node C is excluded from the ring network 2A. As illustrated in the example of FIG. 7, the optical signal transmitted in the sequential order of the nodes B, A, and D is looped back in the node D. Meanwhile, the optical signal transmitted in the sequential order of the nodes D, A, and B is looped back in the node B.

The ring network 3A is constituted by the nodes A, and the node D that terminate the wavelength λ3. Since the node B and the node C allow the wavelength λ3 to pass, the node B and the node C are excluded from the ring network 3A. As illustrated in the example of FIG. 7, the optical signal transmitted in the sequential order of the nodes A to D is looped back in the node D. Meanwhile, the optical signal transmitted in the sequential order of the nodes D to A is looped back in the node A.

As described above, since the transmission apparatus 100 determines whether to loop back the optical signal for each wavelength by referring to the ring configuration information table 101, the transmission apparatus 100 may accurately control the transmission direction of the optical signal when the failure occurs in the ring network 10a.

Description of APS Byte to Transmit Switch Message

FIG. 8 is a diagram illustrating an example of an APS byte. The APS byte used when transmitting the switch messages 151a and 151b will be described by using FIG. 8.

The example of FIG. 8 corresponds to APS byte compliant with the ITU-T G.873.2 standard. As illustrated in the example of FIG. 8, an APS byte 1a is constituted by APS1 to APS4 that are 4 bytes in total.

For example, the APS1 of the APS byte is includes "Bridge Request". The transmission apparatus 100 stores a signal of "signal fail ring (SF-R)" in the "Bridge Request" of the APS1 when the failure occurs in the ring network 10a, for example. Further, the APS2 of the APS byte is includes "Destination Node ID". The transmission apparatus 100 stores an identification (ID) of the reception destination node in the "Destination Node ID" of the APS2. In addition, the APS3 of the APS byte is includes "Source Node ID". The transmission apparatus 100 stores an ID of a transmitting node in the "Source Node ID" of the APS3. Further, the example is described, in which the transmission apparatus 100 stores the signal of "SF-R" in the "Bridge Request" of the APS1 when the failure occurs in the ring network 10a, but the present disclosure is not limited thereto, and the transmission apparatus 100 may store another signal.

The transmission apparatus 100 transmits the switch messages 151a and 151b by using a plurality of frames in the case of transmitting the switch messages 151a and 151b for each wavelength by using the APS byte.

Processing Flow in Transmission Apparatus

Figure 9:
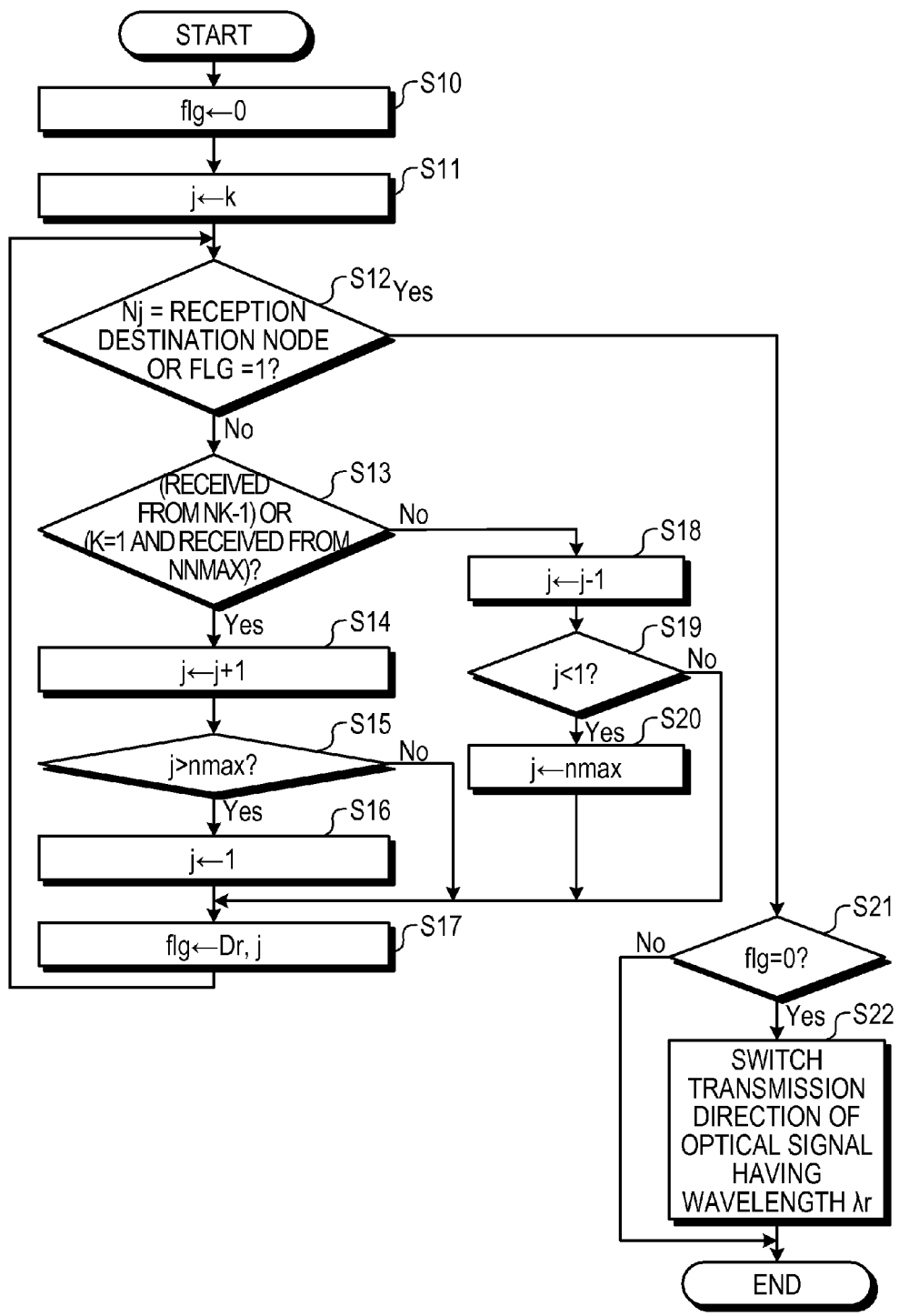
FIG. 9 is a diagram illustrating an example of a processing flow of a switch controller according to the embodiment.

FIG. 9 is a diagram illustrating an example of a processing flow of a switch controller according to the embodiment. The processing flow of the switch controller 110 when the failure occurs in the ring network 10a will be described with reference to FIG. 9. The example of FIG. 9 is an example of a processing flow for a wavelength λr when the switch message is transmitted to a node k. Even when the switch message is transmitted to nodes other than the node k, the processing flow of FIG. 9 is executed. Further, the node k executes the processing flow of FIG. 9 even for the wavelengths other than the wavelength λr. Further, the processing flow of FIG. 9 is applied to the ring network in which the nodes are connected in a ring shape in the order of node numbers 1, 2, 3, . . . , nmax, 1 . . . . The "nmax" indicates the maximum node number.

The switch controller 110 stores 0 in "flg" (operation S10). The "flg" indicates a variable for storing a value acquired from the ring configuration information table 101. When the "flg" is 1, it is represented that the node terminates the wavelength λr. Meanwhile, when the "flg" is 0, it is represented that the node allows the wavelength λr to pass.

The switch controller 110 stores a numerical value "k" in a variable "j" (operation S11). The variable "j" is a variable storing the node number. The numerical value "k" is the node number of the node that receives the switch message 151.

The switch controller 110 determines whether a variable "Nj" is the reception destination node or the "flg" is 1 (operation S12). The variable "Nj" is a variable which indicates a node corresponding to the node number "j". The switch controller 110 performs a process of operation S21 when the variable "Nj" is the reception destination node or the "flg" is 1 ("YES" at operation S12). Meanwhile, the switch controller 110 performs a process of operation S13 when the variable "Nj" is not the reception destination node and the "flg" is not 1 ("NO" at operation S12).

The switch controller 110 determines whether the switch message is received from a node of "Nk−1" or whether the numerical value "k" is 1 and the switch message is received from a node of "Nnmax" (operation S13).

When the switch message is received from the node of "Nk−1" at operation S13 or when the numerical value "k" is 1 and the switch message is received from the node of "Nnmax" ("YES" at operation S13), the switch controller 110 adds 1 to the variable "j" (operation S14). Subsequently, the switch controller 110 determines whether the variable "j" is larger than "nmax" (operation S15). The switch controller 110 assigns 1 to the variable "j" (operation S16) when the variable "j" is larger than "nmax" ("YES" at operation S15). Meanwhile, the switch controller 110 performs a process of operation S17 when the variable "j" is equal to or smaller than "nmax" ("NO" at operation S15).

Meanwhile, when the switch message is not received from the node of "Nk−1" at operation S13 and when the numerical value "k" is not 1 and the switch message is not received from the node of "Nnmax" ("NO" at operation S13), the switch controller 110 subtracts 1 from the variable "j" (operation S18). Subsequently, the switch controller 110 determines whether the variable "j" is smaller than 1 (operation S19). When it is determined that the variable "j" is smaller than 1 ("YES" at operation S19), the switch controller 110 assigns "nmax" to the variable "j" (operation S20). Meanwhile, the switch controller 110 performs the process of operation S17 when the variable "j" is equal to or larger than 1 ("NO" at operation S19).

The switch controller 110 stores a variables 'Dr, j' in the variable "flg". The variable "Dr, j" is a variable which indicates a value corresponding to the node j of the record of the wavelength λr in the ring configuration information table 101. The switch controller 110 stores "0" extracted from the ring configuration information table 101 in the variable 'Dr, j' when the node j does not terminate the wavelength λr. Meanwhile, the switch controller 110 stores "1" extracted from the ring configuration information table 101 in the variable "Dr, j" when the node j terminates the wavelength λr.

The switch controller 110 determines whether the variable "flg" is 0 when performing the processing of operation S21 (operation S21). When it is determined that the variable "flg" is 0 ("YES" at operation S21), the switch controller 110 switches a transmission direction of the optical signal having the wavelength λr (operation S22). Meanwhile, the switch controller 110 ends the process when it is determined that the variable "flg" is 1 ("NO" at operation S21)

Creation and Update of Ring Configuration Information Table

Figure 10:
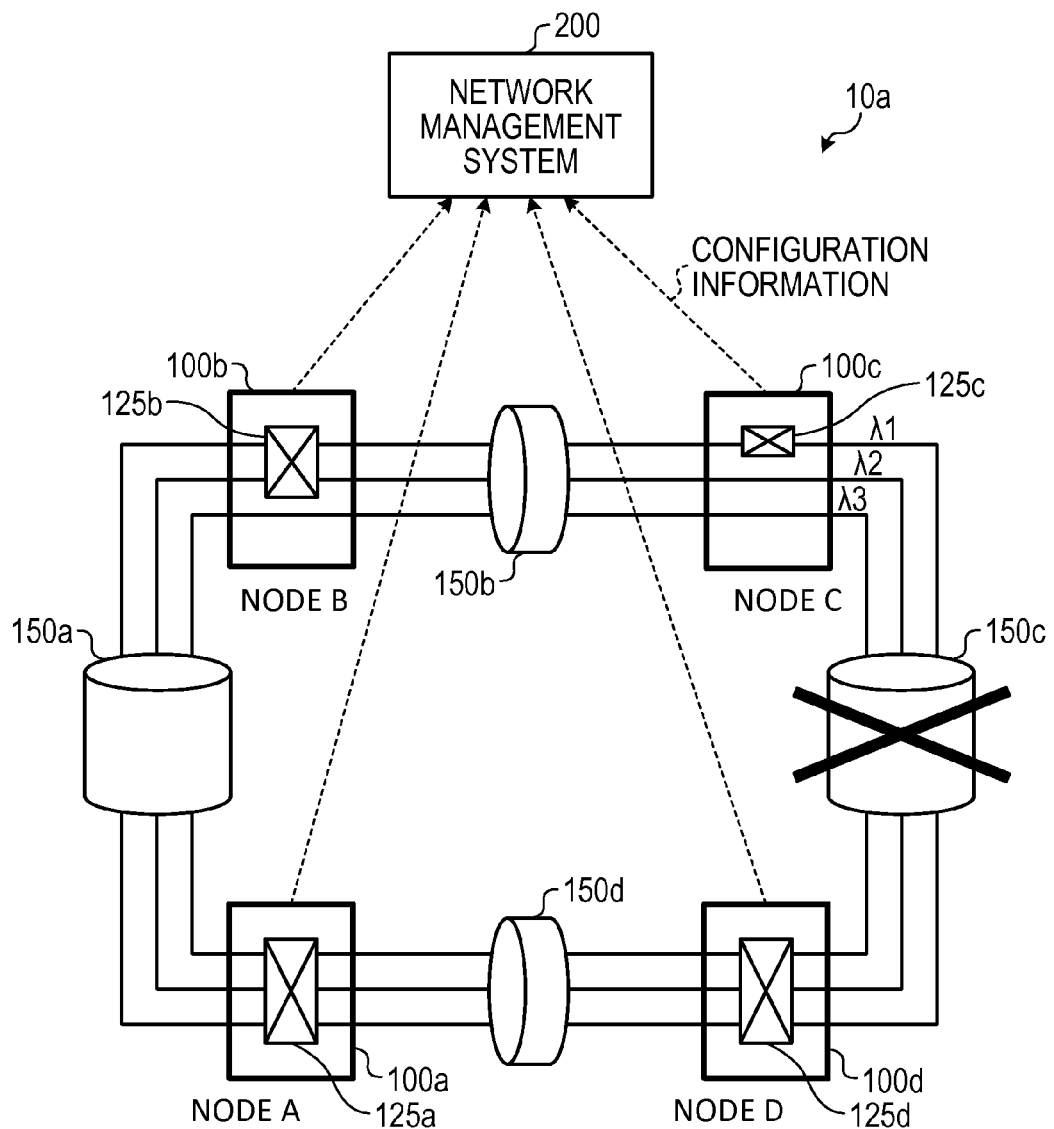
FIG. 10 is a first diagram for describing creation of the ring configuration information table.

FIG. 10 is a first diagram for describing the creation of the ring configuration information table. The creation of the ring configuration information table 101 will be described by using FIG. 10. The ring configuration information table 101 is a table indicating whether each node of the nodes A to D terminates the wavelengths λ1 to λ3. The network management system 200 and each node of the nodes A to D are connected to be communicable with each other. The ring network 10a has the same network configuration as the ring network 10a of FIG. 5. Further, in the example of FIG. 10, the node A corresponds to the transmission apparatus 100a, the node B corresponds to the transmission apparatus 100b, the node C corresponds to the transmission apparatus 100c, and the node D corresponds to the transmission apparatus 100d.

The network management system 200 collects the node configuration information from each node of the nodes A to D. For example, the network management system 200 extracts the configuration information of each node of the nodes A to D, which is stored in the node configuration information table 102. The network management system 200 creates the ring configuration information table 101 by using the configuration information extracted from each node of the nodes A to D.

Next, a detailed example of the processing of creating the ring configuration information table 101 will be described by using FIG. 3 and FIG. 10. As illustrated in the example of FIG. 3, configuration information "1, 1, 0" corresponding to the wavelengths λ1, λ2, and λ3, respectively, are stored in the node configuration information table 102 of the node B. As illustrated in the example of FIG. 10, the network management system 200 acquires the configuration information "1, 1, 0" from the node B through the network.

The network management system 200 registers the configuration information "1, 1, 0" in the ring configuration information table 101 to be corresponded to a column of the node B. The network management system 200 creates the ring configuration information table 101 by performing the processing similarly even for the nodes A, C, and D.

The network management system 200 transmits the created ring configuration information table 101 to each node of the nodes A to D to update the ring configuration information table 101 stored in each node.

The network management system 200 changes each value of the ring configuration information table 101 when the wavelength selected by the wavelength selection switch 131 illustrated in the example of FIG. 4 is dynamically changed. Further, the network management system 200 adds a column of a new node to the ring configuration information table 101 when the new node is added to the ring network 10a.

Figure 11:
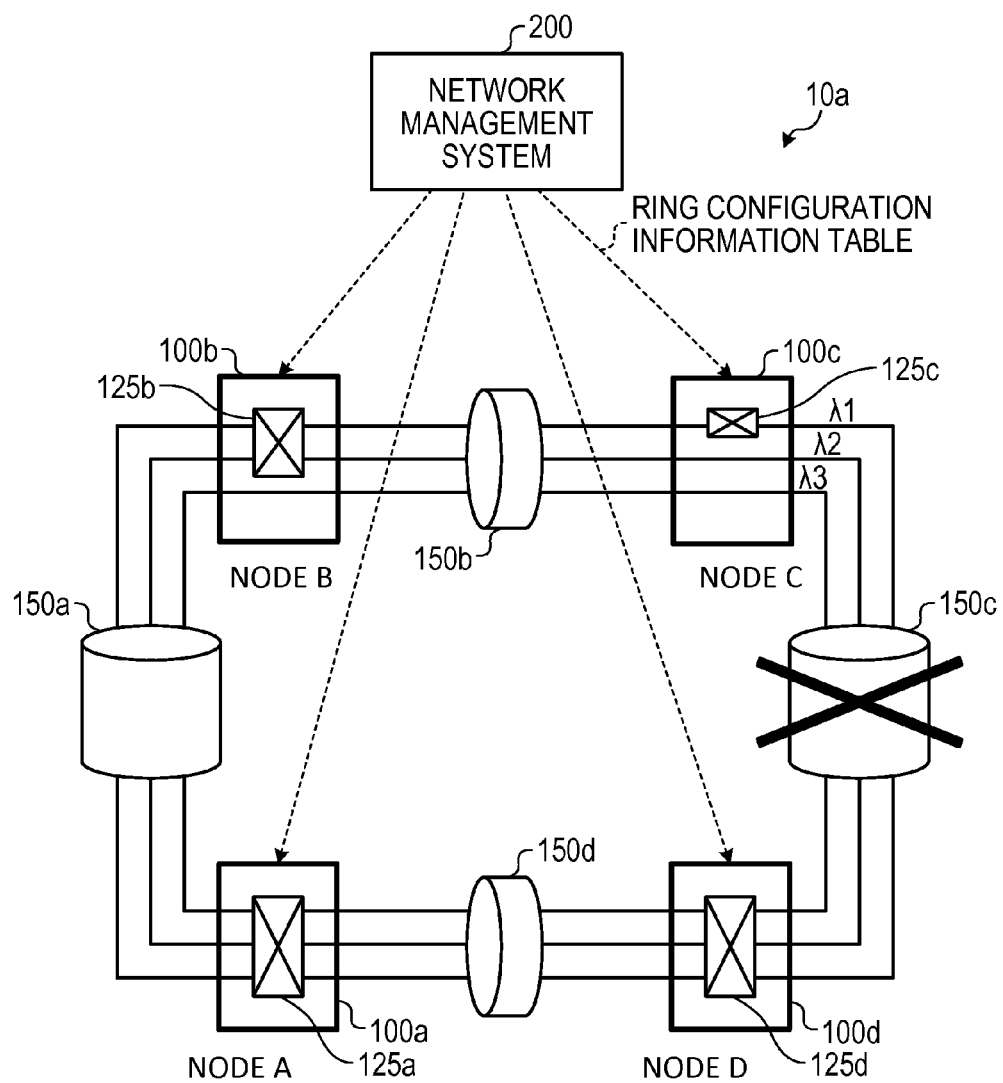
FIG. 11 is a second diagram for describing creation of the ring configuration information table.

FIG. 11 is a second diagram for describing the creation of the ring configuration information table. A detailed example of the processing of updating the ring configuration information table 101 stored in each node will be described by using FIG. 11. As illustrated in the example of FIG. 11, the network management system 200 transmits the created ring configuration information table 101 to each node of the nodes A to D through the network. Each node updates the ring configuration information table 101 stored in the memory with the received ring configuration information table 101.

As described above, the network management system 200 periodically updates the ring configuration information table 101 of each of the nodes A to D in the order described above, to maintain the ring configuration information table 101 of each of the nodes A to D in the latest state. Further, the network management system 200 periodically updates the ring configuration information table 101 of each of the nodes A to D in the order described above, to maintain consistency of the ring configuration information table 101 among the nodes A to D.

Processing in Transmission Apparatus of Reference Example 1

Figure 12:
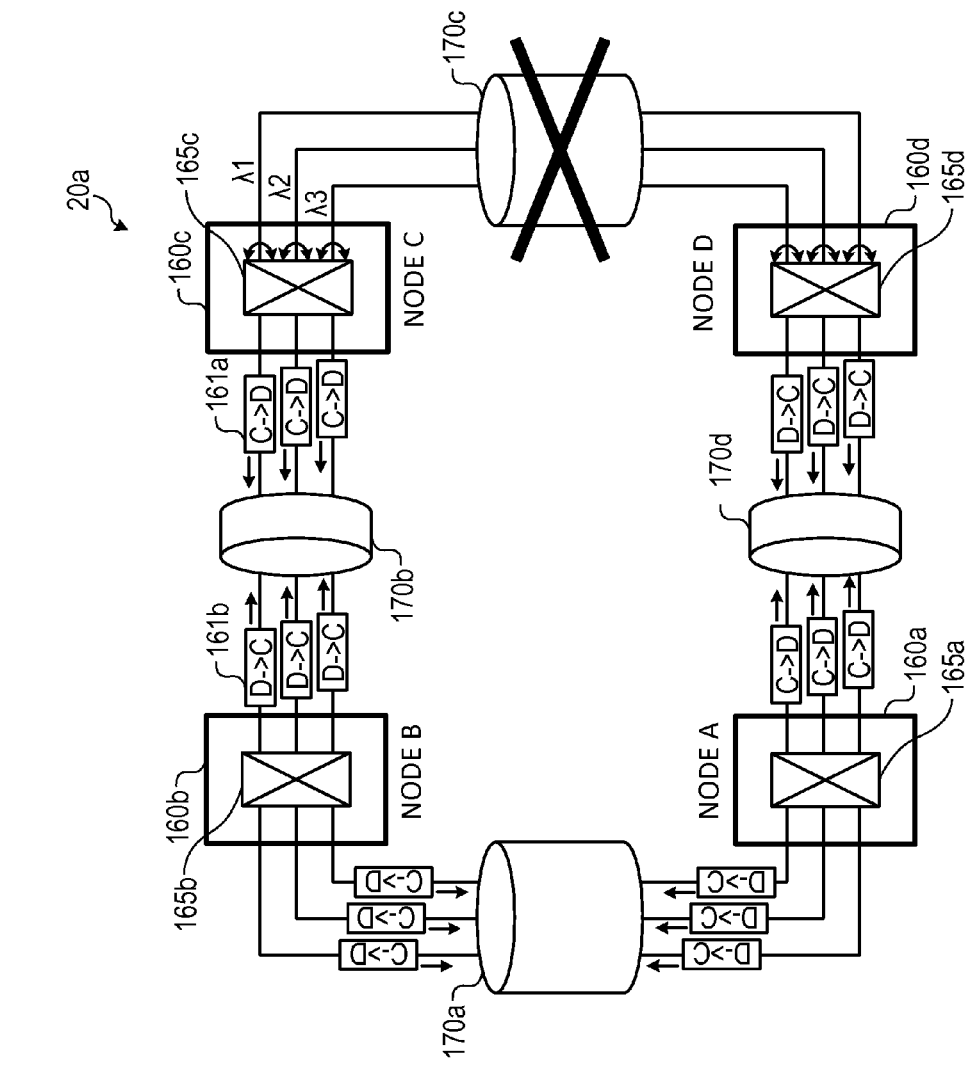
FIG. 12 is a diagram illustrating a second example of the ring network.

FIG. 12 is a diagram illustrating a second example of the ring network. The processing of the transmission apparatus in Reference Example 1 will be described by using FIG. 12. A ring network 20a illustrated in the example of FIG. 12 has the same network configuration as the ring network 10a of FIG. 5. As illustrated in the example of FIG. 12, the failure occurs in a link 170c of the ring network 20a, and as a result, the ring network 20a is in a state in which the optical signal may not be transmitted/received between a transmission apparatus 160c and a transmission apparatus 160d.

The transmission apparatuses 160a to 160d transmit the switch message for each wavelength. For example, the transmission apparatuses 160a to 160d transmit three switch messages 161a and 161b in the case of transmitting the switch messages 161a and 161b having the wavelengths λ1 to λ3. As a result, the transmission apparatuses 160a to 160d process three switch messages 161a and three switch messages 161b, and as a result, the processing load is large. Therefore, the apparatus expense increases.

Processing in Transmission Apparatus of Reference Example 2

Figure 13:
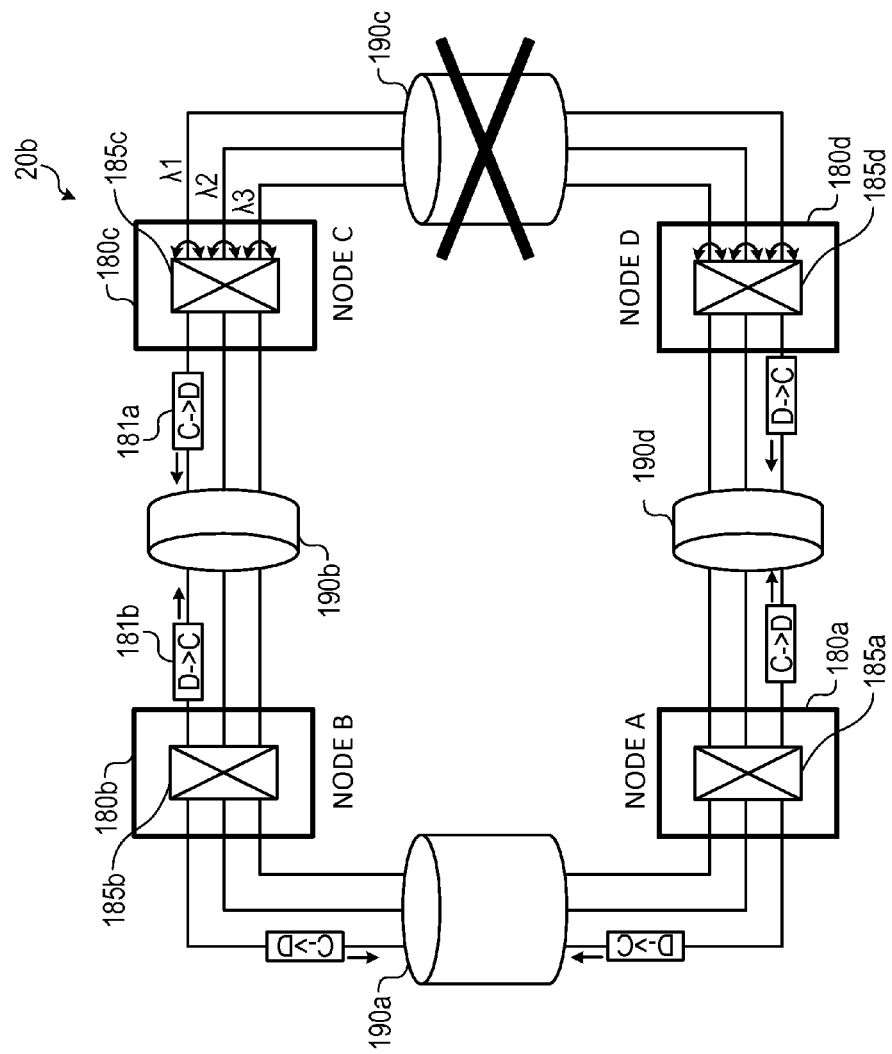
FIG. 13 is a diagram illustrating a third example of the ring network.
Figure 14:
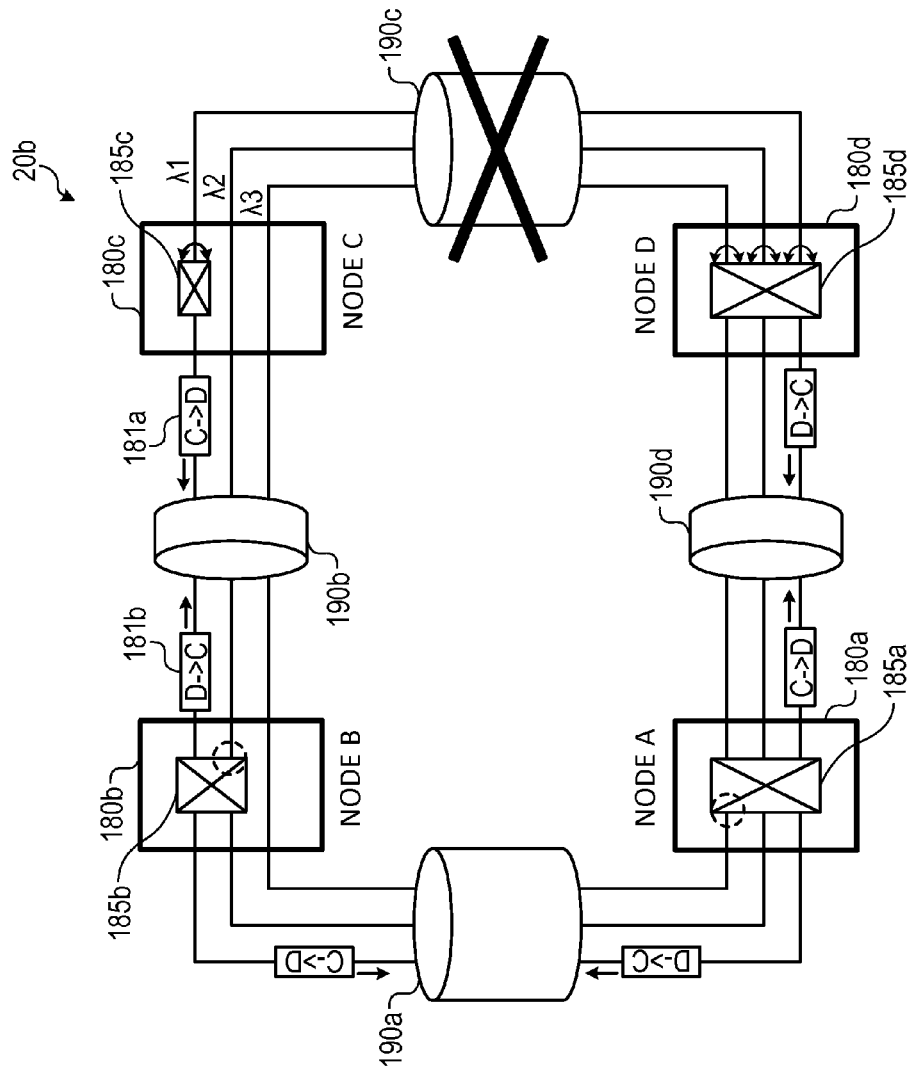
FIG. 14 is a diagram illustrating a fourth example of the ring network.

FIG. 13 is a diagram illustrating a third example of the ring network. FIG. 14 is a diagram illustrating a fourth example of the ring network. The processing of the transmission apparatus in Reference Example 2 will be described by using FIGS. 13 and 14. A ring network 20b illustrated in the example of FIG. 13 has the same network configuration as the ring network 10a of FIG. 5. As illustrated in the example of FIG. 13, the failure occurs in a link 190c of the ring network 20b, and as a result, the ring network 20b is in a state in which the optical signal may not be transmitted/received between a transmission apparatus 180c and a transmission apparatus 180d.

The transmission apparatuses 180a to 180d make a plurality of wavelengths into one group to perform group protection. When the failure occurs in the link 190c of the ring network 20a, the transmission apparatuses 180a to 180d transmit a switch message 181a from the transmission apparatus 180c at the link end where the failure occurs to the transmission apparatus 180d at the other end of the link is set as the reception destination. The transmission apparatus 180c of the link end transmits the switch message 181a in the reverse direction to the link 190c where the failure occurs. The switch message 181a is finally transmitted to the transmission apparatus 180d at the link end of the reception destination. Further, the transmission apparatus 180d at the link end also transmits a switch message 181b by setting the transmission apparatus 180c as the reception destination similarly.

The transmission apparatus 180c loops back the optical signals corresponding to the wavelengths λ1 to λ3 when receiving the switch message 181b. The transmission apparatus 180c transmits the optical signals corresponding to the wavelengths λ1 to λ3, respectively, in a reverse direction to a transmission direction of the switch message 181b. Further, the transmission apparatus 180d also transmits the optical signals corresponding to the wavelengths λ1 to λ3 in a reverse direction to a transmission direction of the switch message 181a similarly. That is, the optical signals corresponding to the wavelengths λ1 to λ3 are looped back in the transmission apparatuses 180c and 180d.

Respective switches 185a to 185d of the transmission apparatuses 180a to 180d may dynamically switch between a wavelength to be terminated and a wavelength to be passed through. The switch 185b of the transmission apparatus 180b terminates the wavelengths λ1 and λ2 and allows the wavelength λ3 to pass. Further, the switch 185c of the transmission apparatus 180c terminates the wavelength λ1 and allows the wavelengths λ2 and λ3 to pass. That is, in the ring network 20b illustrated in the example of FIG. 13, the wavelengths allowed to pass through by the switch 185b and the switch 185c are switched and the same wavelength as that in the ring network 10a of FIG. 5 is allowed to pass through each transmission apparatus 180.

The transmission apparatus 180c transmits one switch message 181a to the transmission apparatus 180d which is the destination by using the wavelength λ1. Meanwhile, the transmission apparatus 180d transmits one switch message 181b to the transmission apparatus 180c which is the destination by using the wavelength λ1.

The loop-back of the optical signal having the wavelength λ2, which is transmitted from the transmission apparatus 180*d* to the transmission apparatus 180*c*, will be described. When the transmission apparatus 180*b* receives the switch message 181*b* from the transmission apparatus 180*d* via the transmission apparatus 180*a*, since the reception destination of the switch message is set as the transmission apparatus 180*c*, the transmission apparatus 180*b* does not loop back the optical signal having the wavelength λ2. As a result, the optical signal having the wavelength λ2 arrives at the transmission apparatus 180*c*. Since the transmission apparatus 180*c* allows the optical signal having the wavelength λ2 to pass, the optical signal having the wavelength λ2 arrives at the link 190*c* where the failure occurs. As described above, the transmission apparatus according to Reference Example 2 may not accurately control the transmission direction of the optical signal when the failure occurs.

The number of switch messages processed in the transmission apparatus 100 of the embodiment, is smaller than the number of switch messages processed in the transmission apparatus 160 of Reference Example 1. Since the processing load in the transmission apparatus 100 of the embodiment is smaller than that of Reference Example 1, the transmission apparatus 100 may reduce the apparatus expense as compared with Reference Example 1.

Since the transmission apparatus 100 of the embodiment determines whether to loop back the optical signal for each wavelength by referring to the ring configuration information table 101, the optical signal does not arrive at the link 190*c* where the failure occurs as in Reference Example 2. As a result, the transmission apparatus 100 of the embodiment may accurately control the transmission direction of the optical signal when the failure occurs in the network.

Hardware Configuration of Transmission Apparatus

Figure 15:
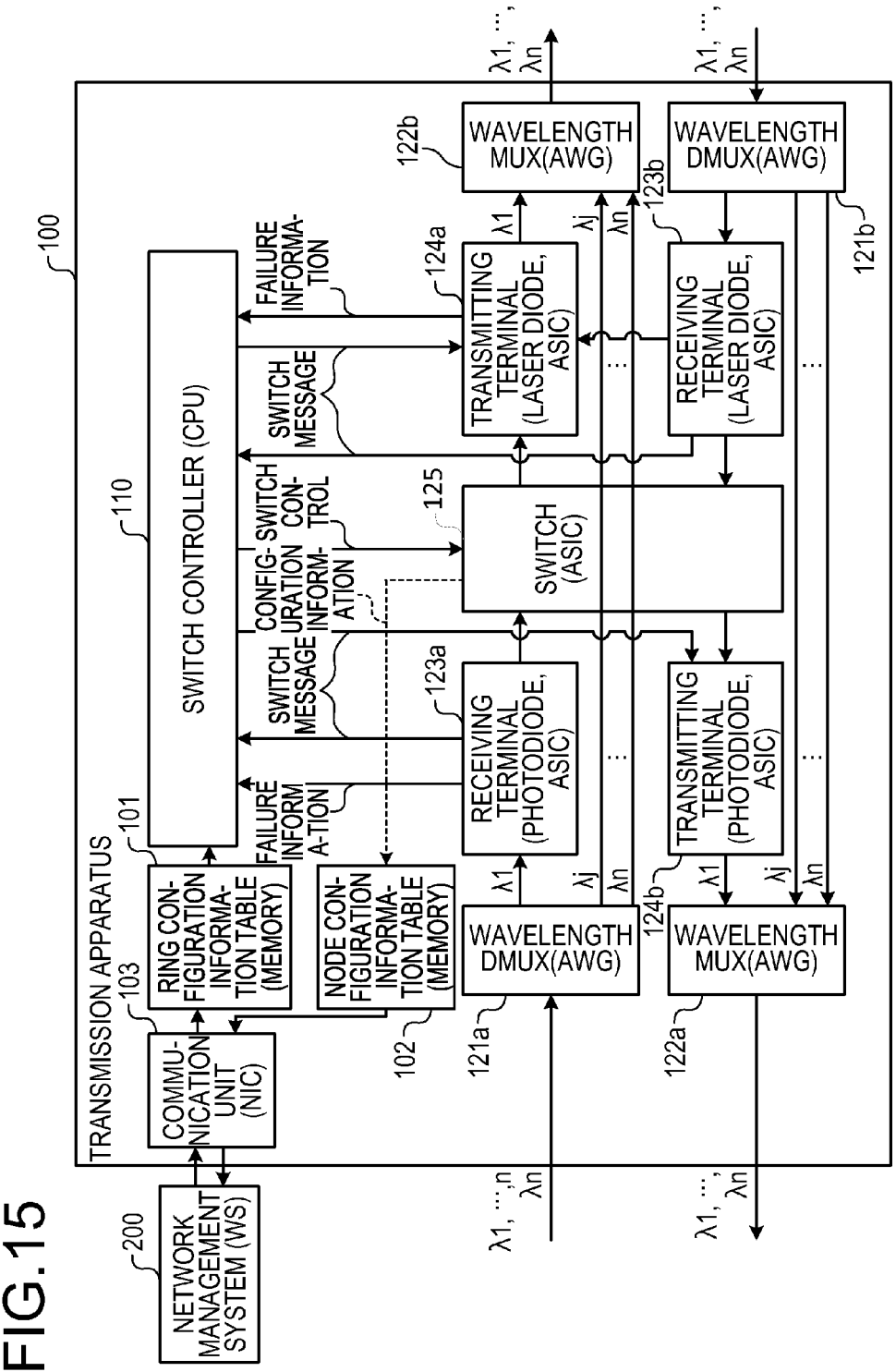
FIG. 15 is a diagram illustrating an example of a hardware configuration of the transmission apparatus of the embodiment.

FIG. 15 is a diagram illustrating an example of a hardware configuration of the transmission apparatus of the embodiment. The wavelength demultiplexers (DMUXs) 121*a* and 121*b* and the wavelength multiplexers (MUXs) 122*a* and 122*b* perform demultiplexing and multiplexing of the wavelength by using, for example, arrayed waveguide grating (AWG), respectively. The receiving terminals 123*a* and 123*b* are constituted by, for example, a photodiode and an ASIC. The receiving terminals 123*a* and 123*b* convert the optical signal into the electrical signal by using the photodiode. Further, the receiving terminals 123*a* and 123*b* perform processing of an electrical frame by using the ASIC.

The transmitting terminals 124*a* and 124*b* are constituted by, for example, an ASIC and a laser diode. The transmitting terminals 124*a* and 124*b* perform the processing of the electrical frame by using the ASIC. Further, the transmitting terminals 124*a* and 124*b* convert the electrical signal into the optical signal by using the laser diode.

The switch 125 performs switching of the electrical frame by using, for example, the ASIC. The ring configuration information table 101 and the node configuration information table 102 are stored in the memory. The interface 103 is implemented by, for example, the NIC. The network management system 200 is terminals such as a workstation, a personal computer, or a server. The switch controller 110 is installed as, for example, a program that operates on the CPU. Further, the hardware configuration of the transmission apparatus 100 is illustrative and other hardware equipment may be used.

The transmission apparatus 100 includes a storage unit which stores the table 101 in which the wavelength terminated by the transmission apparatus is associated with each of the transmission apparatuses forming the ring network and a transmission unit which transmits a message including failure information to other transmission apparatus when the failure occurs in the ring network. Further, when the message is received from other transmission apparatus, the transmission apparatus 100 determines whether its own transmission apparatus is the last transmission apparatus that terminates the wavelength among the transmission apparatuses that are present on the way up to the link where the failure occurs in the ring network 10*a*, based on the table, when the transmission apparatus 100 determines that its own transmission apparatus is the last transmission apparatus that terminates the wavelength, the transmission apparatus 100 includes the switch controller 110 that controls switching the transmission direction of the signal having the wavelength in its own transmission apparatus. Further, the transmission apparatus 100 includes the switch 110 that is controlled by the switch controller 110 to switch the transmission direction of the signal for each wavelength. As a result, the transmission apparatus 100 may accurately control the transmission direction of the optical signal for each wavelength when the failure occurs in the ring network. In addition, the transmitting terminal 124 is an example of the transmission unit. Further, the ring configuration information table 101 is an example of the table.

Each of the transmission apparatuses forming the ring network transmits information regarding whether to terminate each wavelength, to create the table. As a result, the transmission apparatus 100 may maintain information of a table used for restoration in the latest state when the failure occurs in the ring network 10*a*.

The transmission apparatus 100 also includes a termination controller that performs a control of switching between terminating the signal having each wavelength and allowing the signal having each wavelength to pass. As a result, the transmission apparatus 100 may accurately control the transmission direction of the optical signal for each wavelength when the failure occurs in the ring network even though the wavelength of the signal terminated by each transmission apparatus is dynamically changed. Further, the wavelength selection switch 131 is an example of the termination controller.

The transmission unit uses the wavelengths terminated in the transmission apparatuses at both sides of the link where the failure occurs at the time of transmitting the message to other transmission apparatus. As a result, the transmission apparatus 100 may prevent a situation in which the message passes through the transmission apparatus of the reception destination.

A design may be appropriately changed within the scope without departing from the spirit of the present disclosure.

Information including the processing sequence, the control sequence, detailed names, and various data or parameters illustrated in the embodiment may be arbitrarily changed unless otherwise indicated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus being one of a plurality of transmission apparatuses forming a ring network, the transmission apparatus comprising:
  a memory in which a wavelength terminated by at least one of the plurality of transmission apparatuses that is associated with the at least one of the plurality of transmission apparatuses, is stored; and
  a processor coupled to the memory, the processor being configured to:
    receive a signal, including a first wavelength, traveling in a first direction in the ring network;
    transmit a message including failure information to another transmission apparatus when a failure occurs in the ring network, the message identifying a plurality of wavelengths that includes the first wavelength and that is affected by the failure;
    determine whether its own transmission apparatus is a last transmission apparatus that terminates the first wavelength, based on data stored in the memory, when receiving the message including the failure information from another transmission apparatus, and to perform a control of switching a transmission direction, from the first direction, of the signal having the first wavelength when the switch controller determines that its own transmission apparatus is the last transmission apparatus to terminate the first wavelength; and
    control a switch to switch a transmission direction of the signal.

2. The transmission apparatus according to claim 1, wherein the transmission apparatus is configured to transmit, to other transmission apparatus forming the ring network, information regarding whether each of wavelengths used in the ring network is to be terminated or not so as to create the data stored in the memory.

3. The transmission apparatus according to claim 1, wherein the processor is further configured to:
  perform a control of switching whether the signal is terminated or passed.

4. The transmission system according to claim 1, wherein the processor is further configured to use a path of the wavelength terminated in the transmission apparatuses at both ends of the link where the failure occurs for transmitting the message to a second transmission apparatus.

5. A non-transitory computer-readable recording medium storing a program that causes a computer to execute a procedure for a transmission apparatus being one of a first plurality of transmission apparatuses forming a ring network, the procedure comprising:
  receiving a signal, including a first wavelength, traveling in a first direction in the ring network;
  determining whether its own transmission apparatus is a last transmission apparatus that terminates the first wavelength based on a data stored in a memory, in which the first wavelength terminated by each of the first plurality of transmission apparatuses is associated with each of the first plurality of transmission apparatuses, when a failure occurs in the ring network and a message including failure information to be transmitted is received from another transmission apparatus, the message identifying a plurality of wavelengths that includes the first wavelength and that is affected by the failure; and
  switching a transmission direction of the signal when it is determined that its own transmission apparatus is the last transmission apparatus terminating the wavelength.

6. A transmission method in a transmission system forming a ring network by a first plurality of transmission apparatuses, the transmission method comprising:
  receiving a signal, including a first wavelength, traveling in a first direction in the ring network:
  transmitting a message including failure information from a first transmission apparatus to a second transmission apparatus, each of the first and second transmission apparatuses being one of the first plurality of transmission apparatuses and one of the transmission apparatuses of both ends of a failure link on which a failure occurs in the ring network, the message identifying a plurality of wavelengths that includes the first wavelength and that is affected by the failure;
  receiving the message by the second transmission apparatus;
  determining, by the second transmission apparatus, whether the second transmission apparatus is a last transmission apparatus that terminates the first wavelength, based on data stored in a memory, in which the first wavelength terminated by each of the first plurality of transmission apparatuses forming the ring network is associated with each of the first plurality of transmission apparatuses; and
  switching, by the second transmission apparatus, a transmission direction of the signal when it is determined that the second transmission apparatus is the last transmission apparatus terminating the wavelength.

* * * * *